US012431794B2

(12) United States Patent
Malinin (10) Patent No.: US 12,431,794 B2
(45) Date of Patent: Sep. 30, 2025

(54) LLC CONVERTER WITH PROTECTION CIRCUIT

(71) Applicant: Infineon Technologies Austria AG, Villach (AT)

(72) Inventor: Andrey Malinin, Fort Collins, CO (US)

(73) Assignee: Infineon Technologies Austria AG, Villach (AT)

( * ) Notice: Subject to any disclaimer, the term of this patent is extended or adjusted under 35 U.S.C. 154(b) by 208 days.

(21) Appl. No.: 18/472,852

(22) Filed: Sep. 22, 2023

(65) Prior Publication Data

US 2025/0105729 A1  Mar. 27, 2025

(51) Int. Cl.
*H02M 3/00* (2006.01)
*H02M 1/00* (2006.01)
*H02M 1/04* (2006.01)
*H02M 3/335* (2006.01)

(52) U.S. Cl.
CPC ........... *H02M 3/01* (2021.05); *H02M 1/0058* (2021.05); *H02M 1/047* (2013.01); *H02M 3/33507* (2013.01)

(58) Field of Classification Search
CPC ...... H02M 3/01; H02M 1/0058; H02M 1/047; H02M 3/33507
See application file for complete search history.

(56) References Cited

U.S. PATENT DOCUMENTS 9,257,913 B1 * 2/2016 McDonald .......... H02M 3/3376
2017/0331383 A1 * 11/2017 Hsiao ...................... H02M 3/01

* cited by examiner

*Primary Examiner* — Adolf D Berhane
*Assistant Examiner* — Afework S Demisse
(74) *Attorney, Agent, or Firm* — Banner & Witcoff Ltd.

(57) ABSTRACT

An LLC (inductor-inductor-capacitor) converter, including: a primary current sensing circuit operable to sense a primary current of the LLC converter; and a protection circuit coupled between the primary current sensing circuit and power switches of the LLC converter, and operable to increase a switching frequency of the LLC converter when an amplitude of the primary current falls below a predefined low current reference value after a predefined blanking time after a phase transition of the LLC converter.

17 Claims, 5 Drawing Sheets

100B
Waveform Diagram of Operation of LLC Converter 100 of FIG. 1A

LLC CONVERTER WITH PROTECTION CIRCUIT

BACKGROUND

Resonant converters are widely recognized for their advantageous features, including soft-switching, high efficiency, low electromagnetic interference (EMI), and high power density.

Among the various resonant converter architectures, the LLC (inductor-inductor-capacitor) converter architecture is popular primarily because of its zero voltage switching (ZVS) capability over various operating conditions. ZVS is when switching occurs when the output voltage is approximately zero volts. ZVS can be lost when the input voltage drops, which may result in safe operating area (SOA) violations and catastrophic failures.

Below resonance operation mode for an LLC converter generally maintains ZVS. However, ZVS may be compromised if the input voltage is too low. To optimize energy storage utilization, it is preferable to allow the input voltage to decrease to its minimum level during holdup. Operating at the boundary of the ZVS operation ensures safe operation even at the minimum input voltage. Predictive detection with closed-loop control should ensure this function.

DETAILED DESCRIPTION

The present disclosure is directed to a protection circuit of an LLC (inductor-inductor-capacitor) converter. The protection circuit monitors a primary current of the LLC converter to detect below resonance conditions dynamically. This detection mechanism aims to mitigate potentially hazardous conditions and catastrophic failures.

Figure 1A:
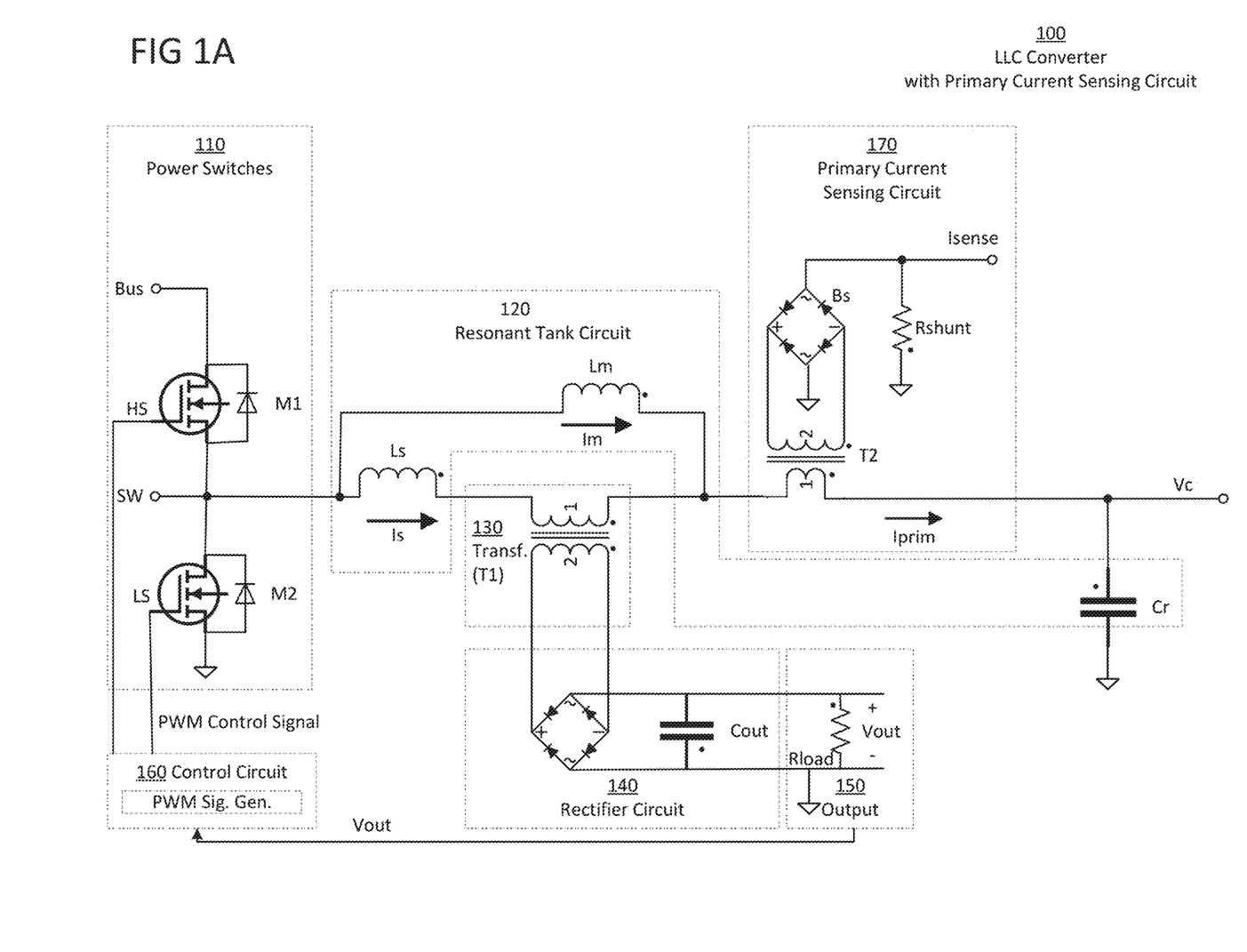
FIG. 1A illustrates a schematic diagram of an LLC (inductor-inductor-capacitor) converter, along with a primary current sensing circuit, in accordance with aspects of the disclosure.

FIG. 1A illustrates a schematic diagram of an LLC (inductor-inductor-capacitor) converter 100 with a primary current sensing circuit 170, in accordance with aspects of the disclosure.

The LLC converter 100 comprises power switches 110, a resonant tank circuit 120, a transformer 130, a rectifier circuit 140, an output 150, and a control circuit 160. This LLC converter 100 is presented as an example. LLC converters and their operation are generally known, and the disclosure is not limited to this particular LLC converter topology.

The power switches 110 are operable to convert a direct current (DC) voltage from a pulse width modulation (PWM) signal generator circuit of the control circuit 160 into a square wave. The power switches 110 in this example comprise two n-channel MOSFETs M1, M2 coupled in series between a bus and a signal ground. The power switch M1 is coupled between the bus and a switching node SW. The power switch M2 is coupled between the switching node SW and the signal ground. "HS" is the high side control signal for power switch M1, and "LS" is the low side control signal for power switch M2.

The power switches 110 are shown implemented in a half-bridge topology but may alternatively be implemented in a full-bridge topology. The main difference between these topologies is that full-bridge topology generates a square wave output with no DC offset, with an amplitude equal to the input voltage ranging from +Vin to −Vin. The half-bridge topology provides a square wave offset by (Vin/2), which has half the amplitude of the full bridge wave.

The transformer 130 is connected to the resonant tank circuit 120 and transfers energy from the resonant tank circuit 120 to the output load Rload. The transformer 130 separates the primary and secondary sides of the LLC converter 100. It is operable to scale the sine wave from the resonant tank circuit 120 the voltage up or down, according to the output requirement.

The magnetizing inductor Lm is coupled between the switching node SW and the first terminal of the resonant capacitor Cr (via a transformer T2 of the primary current sensing circuit 170, discussed below). A second terminal of the resonant capacitor Cr is coupled to the signal ground. The leakage inductor Ls is coupled between the switching node SW and the first terminal of transformer 130 (T1), which has its second terminal coupled to the first terminal of the resonant capacitor Cr (via transformer T2). Magnetizing current Im passes through the magnetizing inductor Lm and flows within a primary side of the LLC converter 100. Leakage current Is passes through the leakage inductor Ls and flows through the load Rload.

Lastly, the rectifier circuit 140 is operable to rectify and filter the incoming scaled sine wave into a stable DC output at the load Rload. The rectifier circuit 140 comprises a bridge rectifier Br and an output capacitor Cout. The bridge rectifier Br converts the sine wave into a pulsating DC wave. The rectifier Br is shown in a full-bridge topology. Rectifier circuits and their operation are known, and for the sake of brevity, a further description of their operation is omitted here. The output capacitor Cout smoothens the rectified wave and reduces ripple to output a DC wave with reduced ripple.

Control circuit 160 monitors the output voltage Vout and adjusts the LLC converter 110's operation to maintain a desired output level. The control circuit 160 typically includes a feedback loop that compares the output voltage Vout to a reference voltage. Control circuit 160 adjusts the operating frequency of the LLC converter 100 to regulate the output Vout via a PWM signal generator circuit. The output of the PWM signal generator is a PWM control signal, which could be voltage, current, or any other gate drive pulses to be regulated.

The LLC converter 110 is operable in any of four modes-buck converter mode, boost converter mode, series resonance mode, and below resonance mode. These modes are contingent upon specific voltage and switching frequency criteria. The buck converter mode occurs when the output voltage is lower than the input voltage (nVout<Vin), and the switching frequency is higher than the series resonance frequency (Fsw>Fres (LsCr)). Conversely, the boost converter mode occurs when the output voltage is higher than the input voltage (nVout>Vin), and the switching frequency is less than the series resonance frequency (Fsw<Fres (LsCr)).

The series resonance mode occurs when the output voltage equals the input voltage (nVout=Vin), and the switching frequency is equal to the series resonance frequency (Fsw=Fres (LsCr)). The conditions that define the below resonance mode lack precise definition. However, a loss of ZVS compromises the LC converter 110's capacity to deliver the requisite output power, making it advisable to avoid such a circumstance. This disclosure is pertinent to the scenarios where the switching frequency is lower than the series resonance frequency (Fsw<Fres (LsCr)), as operation below resonance cannot be sustained.

The LLC converter 110 has four topological states, with a first half frequency period during topological states 1 and 2, and a second half frequency period during topological states 3 and 4. Topological states 3 and 4 are similar to topological states 1 and 2, respectively, but with opposite polarity.

Topological states 1 and 3 are the standard LLC converter topological states. During topological state 1, power switch M1 is on, while power switch M2 is off. Current is delivered to the resonant tank circuit 120. The diodes of the rectifier circuit 40 are forward biased and connect the output capacitor Cout to the transformer's 130 secondary side. The leakage current Is increases, and the voltage across the resonant capacitor Cr increases. After some time, the voltage on the resonant capacitor Cr increases and Is decreases, eventually reaching zero. The diodes of the rectifier circuit 140 become reverse biased and disconnect the output capacitor Cout from the resonant tank circuit 120. At this moment, the LLC converter 100 transitions to topological state 2. During topological state 1, the magnetizing current Im also increases and changes polarity from negative at the beginning to positive at the end. During topological state 3, power switch M1 is off while power switch M2 is on, so the voltage across the resonant tank circuit 120 reverses. The remaining power stored in the resonant tank circuit 120 is transferred to the secondary side of transformer 130 with current flowing in the opposite direction relative to topological state 1. The magnetizing current Im decreases.

In topological state 2, the power switch M1 remains on, maintaining the voltage at the switch node SW at the level of the bus voltage Vbus. Simultaneously, the magnetizing current Im sustains its flow in the direction indicated in FIG. 1A by the arrow. Depending on the voltage on the resonant capacitor Cr, Im can increase, stay the same, or decrease. Topological state 2 ends by turning off the power switch M1, upon which the magnetizing current Im exerts its influence, causing the voltage at the switch node SW to transition from the bus voltage Vbus to signal ground GND. During this state, the magnetizing current Im continues to flow through the body diode of the power switch M2, until the power switch M2 is switched on. This transition is commonly referred to as "freewheeling." The duration of the body diode conduction time is relatively brief and not an essential aspect of the disclosure; and for the sake of discussion, it can be assumed to be negligible.

Figure 1B:
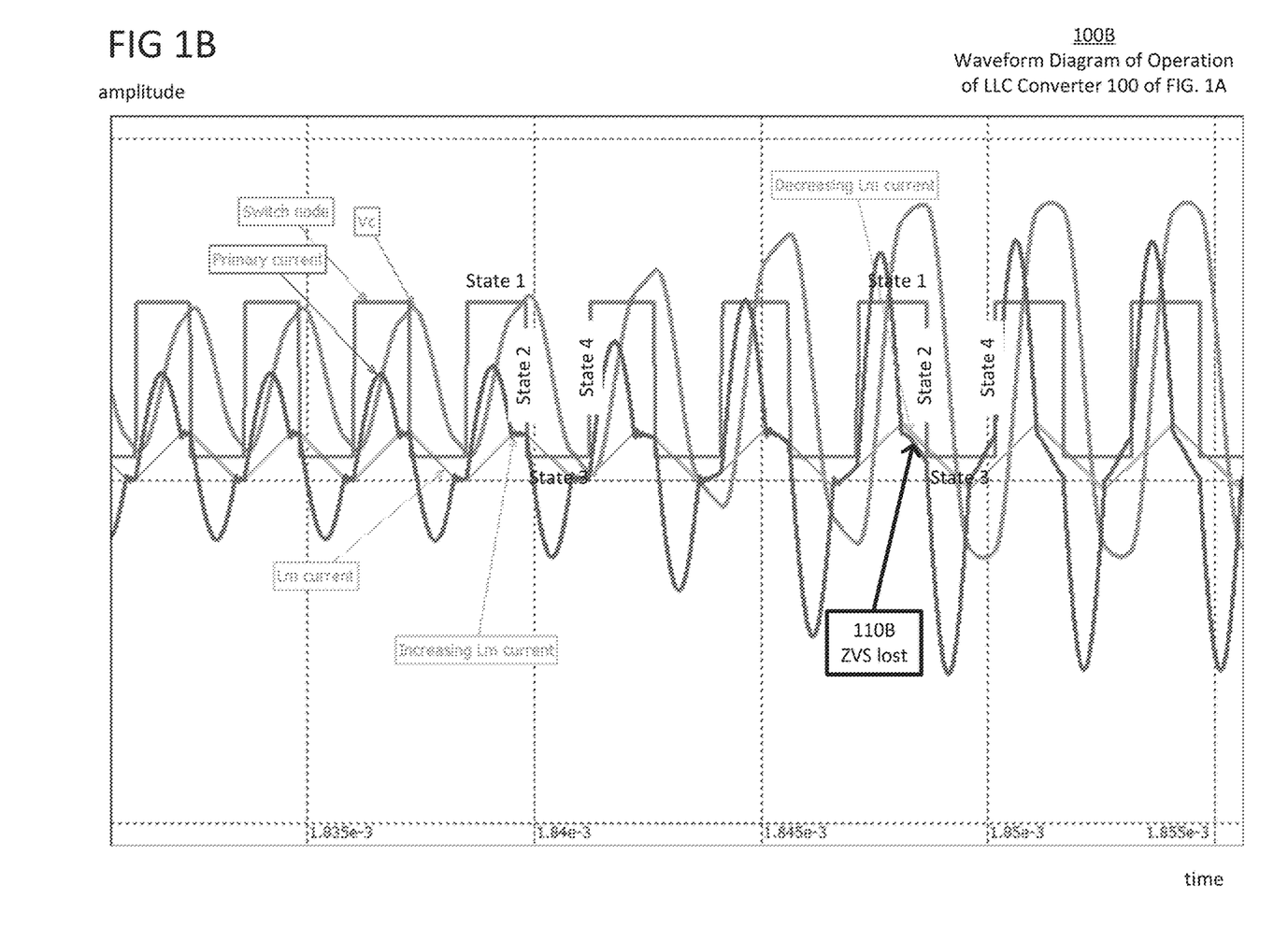
FIG. 1B illustrates a waveform diagram of the operation of the LLC converter of FIG. 1A.

FIG. 1B illustrates a waveform diagram 100B of the operation of the LLC converter 100 of FIG. 1A. ZVS is maintained as long as the magnetizing current Im continues to flow in the appropriate direction and has a sufficiently high magnitude when the power switch M1 is turned off. However, when the LLC converter 110 operates with a switching frequency that is less than the series resonance frequency (Fsw<Fres (LsCr)), the voltage across the resonant capacitor Cr could potentially be significantly greater than that of the bus voltage Vbus, and magnetizing current Im reduces to a level insufficient to ensure switch node SW transitions to GND level. In this case, the power switch M2 is switched on with some residual voltage, increasing the switching losses. In more severe cases, magnetizing current Im can reverse direction and flow through the body diode of power switch M1 during the time power switch M2 is switched on, causing a potential failure of the LLC converter 100 due to a body diode reverence recovery effect.

Figure 2:
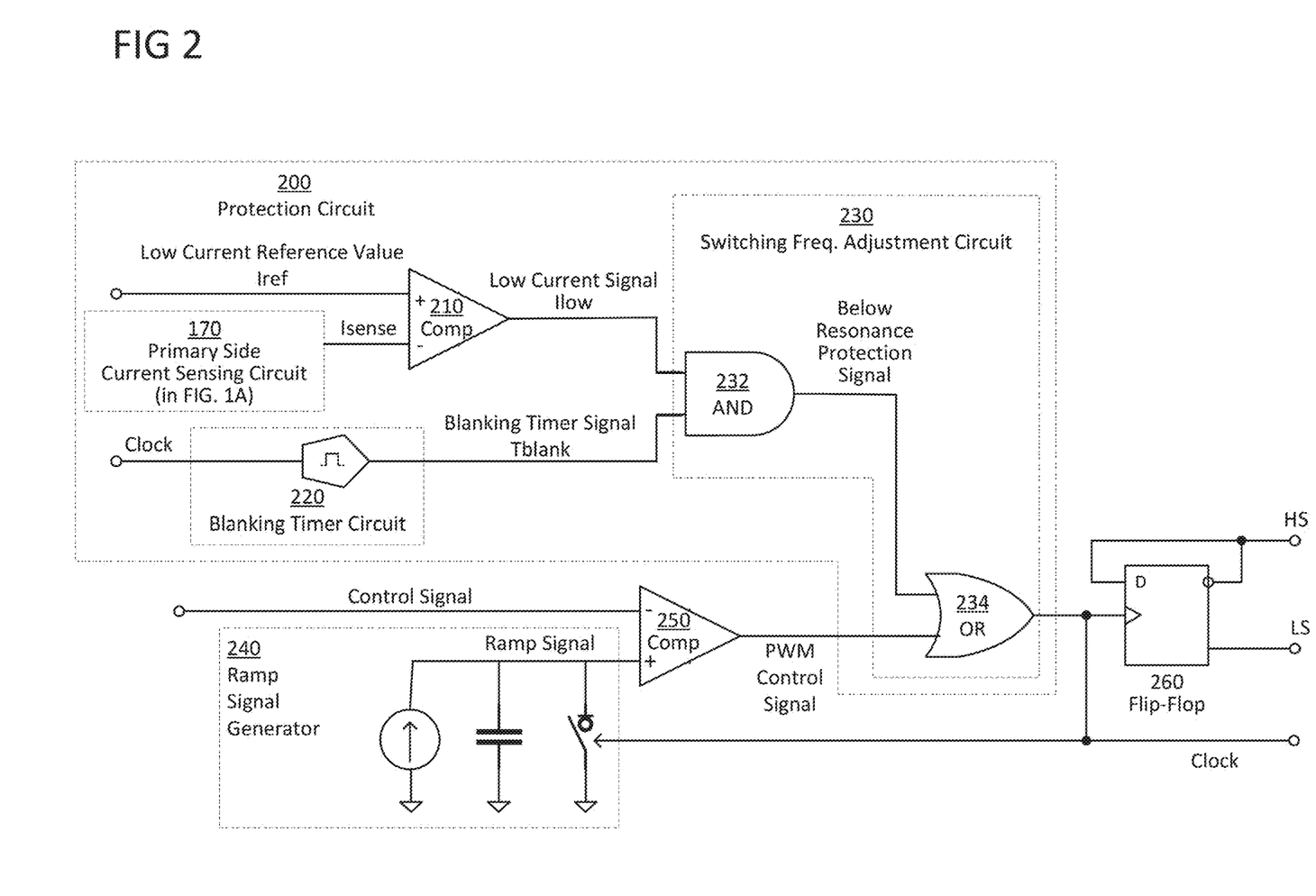
FIG. 2 illustrates a functional diagram of a protection circuit in accordance with aspects of the disclosure.

FIG. 2 illustrates a functional diagram of a protection circuit 200 in accordance with aspects of the disclosure.

By way of overview, the protection circuit 200 employs a low current signal Ilow. This signal Ilow remains logic low when the amplitude of the primary current Iprim is higher than a predefined low current reference value Iref for both positive and negative current directions. Conversely, the low current signal Ilow goes to logic high when the amplitude falls below this predefined low-current reference value Iref. Additionally, a blanking timer signal Tblank is set to logic high at a predefined blanking time after a phase transition of the LLC converter 100, which occurs at the end/beginning of a half-switching cycle. In scenarios where the low current signal Ilow transitions to a logic high state concurrently with the blanking timer signal Tblank being at a logic high, the protection circuit 200 intervenes by increasing the switching frequency of the LLC converter 100. Of course through the disclosure logic high/low is a design choice and not limiting.

More specifically, the protection circuit 200 is coupled between the primary current sensing circuit 170 and the power switches M1, M2 of the LLC converter 100. The primary current sensing circuit 170 is operable to sense a current Iprim of a primary side of the LLC converter 100 and output a primary current sense signal Isense.

The protection circuit 200 comprises a low current comparator circuit 210, a blanking timer circuit 220, and a switching frequency adjustment circuit 230.

The low current comparator circuit 210 is operable to generate a low current signal Ilow. When the amplitude of the sensed primary current Isense falls below the predefined low current reference value Iref, the low current signal Ilow goes high. The predefined low current reference value Iref is lower than a magnetizing current Im of the LLC converter 100 during normal operation. Further, the low current comparator circuit 210 is operable to generate the low current signal Ilow in a high state when the switching frequency of the LLC converter 100 is less than its resonant frequency or only when the LLC converter 100 is operating in a freewheeling mode following a power delivery mode. To ensure effective ZVS without triggering false protection events, the designated low current reference value Iref is set lower than an amplitude of magnetizing current during normal operation and higher than a minimal current that ensures ZVS.

The blanking timer circuit 220 is operable to reset a blanking timer signal Tblank after the phase transition and set the blanking timer signal Tblank to logic high at the predefined blanking time after the phase transition. The predefined blanking time duration is set to exceed half the period of the series resonance frequency of the LLC converter 100. This choice prevents false triggering caused by post-leakage current cessation ringing.

The switching frequency adjustment circuit 230 is coupled to the outputs of the low current comparator circuit 210 and the blanking timer circuit 220. The switching frequency adjustment circuit 230 is operable to generate a below resonance protection signal to increase the switching frequency of the LLC converter 100 based on a combination of the low current signal Ilow and the blanking timer signal Tblank. The switching frequency adjustment circuit 230 is operable to increase the switching frequency by turning the power switches M1, M2 off. The switching frequency is increased by terminating a current half-switching period and starting a new half-switching period of the LLC converter 100.

The switching frequency adjustment circuit 230 comprises an AND circuit element 232 and an OR circuit element 234. The AND circuit element 232 has a first input terminal connected to an output terminal of the low current comparator circuit 210, a second input terminal connected to an output terminal of the blanking timer circuit 220, and an output terminal operable to output the below resonance protection signal. The OR circuit element 234 has a first input terminal connected to an output terminal of the AND circuit element 232, a second input terminal connected to an output terminal of a PWM comparator circuit 250, and an output terminal connected to the power switches M1, M2 of the LLC converter 100 via flip-flop 260. The PWM comparator circuit 250 is operable to compare the control signal with a ramp signal generated by ramp signal generator 240, as is known and not further described here.

Figure 3:
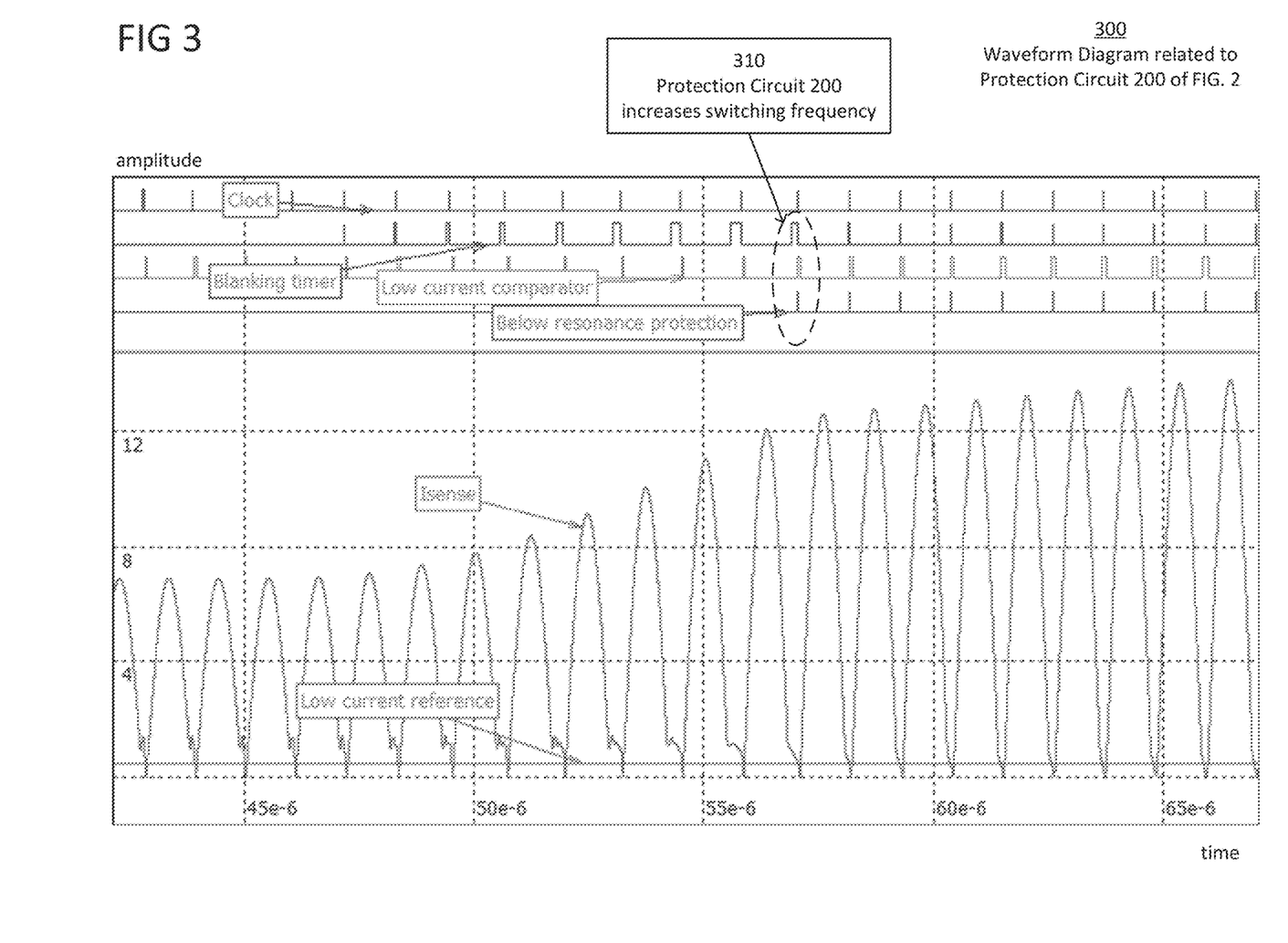
FIG. 3 illustrates a waveform diagram related to the protection circuit of FIG. 2 in accordance with aspects of the disclosure.

FIG. 3 illustrates a waveform diagram 300 related to the protection circuit 200 of FIG. 2, in accordance with aspects of the disclosure.

On the left side of the waveform diagram 300, the load Rload is relatively light, and the switching frequency is relatively high, so the blanking timer signal Tblank is at logic low. The low current comparator signal Ilow goes high at the beginning of each half cycle.

Moving to the right of the waveform diagram 300, the load Rload increases, the switching frequency decreases, and the blanking timer opens a below resonance detection window.

Moving to the right of the waveform diagram 300, the load Rload increases further, forcing the primary current Iprim (sensed as sense current Isense) to fall below the predefined low current reference value Iref before the clock pulse terminates the half-switching cycle. This causes the below resonance protection signal to go to logic high, and the protection circuit 200 increases the switching frequency of the LLC converter 100, as shown in FIG. 3 at reference numeral 310, by turning the power switches M1, M2 off, and by starting a new half-switching period of the LLC converter 100.

Figure 4:
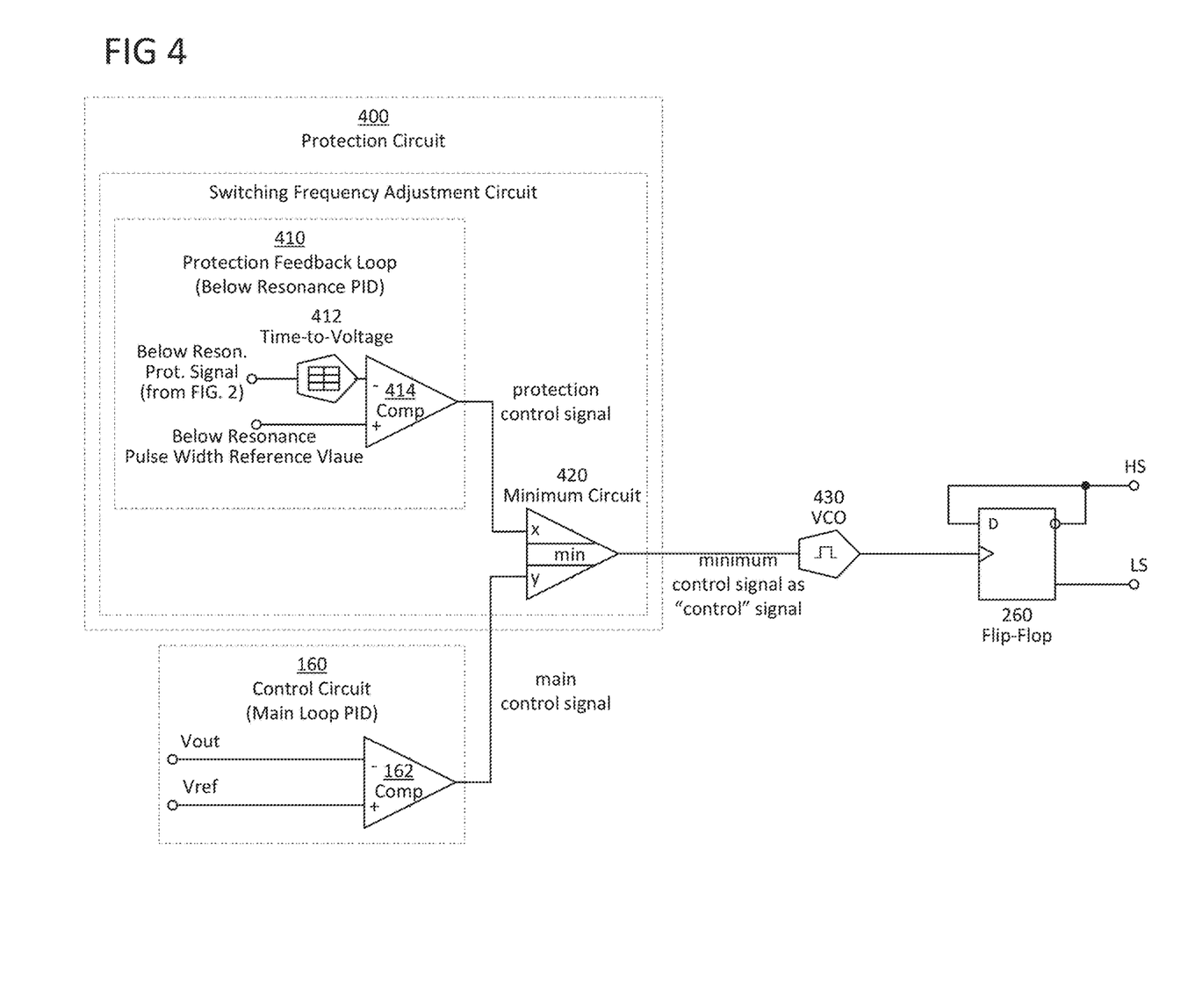
FIG. 4 illustrates a schematic diagram of a protection circuit in accordance with aspects of the disclosure.

FIG. 4 illustrates a schematic diagram of a protection circuit 400 in accordance with aspects of the disclosure.

Rather than the protection circuit increasing the switching frequency of the LLC converter 100 by turning the power switches M1 and M2 off, and by starting a new half-switching period, as described in FIG. 2, the protection circuit 400 of FIG. 4 comprises a protection feedback loop 410 that is operable to reset a voltage-controlled oscillator 430 for the power switches M1, M2.

The protection feedback loop 410 (a below resonance PID) comprises a time-to-voltage circuit element 412 and a comparator 414. The time-to-voltage circuit element 412 determines the pulse width of the below resonance protection signal. The comparator 414 compares this pulse width with a predefined below resonance pulse width reference value and outputs a protection control signal.

The main feedback of the control circuit 160 (main loop PID) is the standard feedback controlling loop. The control circuit 162 compares the output voltage Vout with a reference voltage Vref to output a difference as a main control signal, as is known.

The minimum circuit 420 selects, as a control signal of the LLC converter 100, which of the protection control signal and the protection feedback loop 410 and the main control signal from the control circuit 160 has a minimum value and outputs the selected minimum control signal as the "control" signal. Thus, if the pulse width of the below resonance protection signal is less than the below resonance pulse width reference value, the loop is saturated high at the minimum frequency. The protection circuit 400 thus increases the switching frequency of the LLC converter 100.

To achieve variable frequency control, instead of a PWM signal generator of the control circuit 160 of FIG. 1A, a voltage-controlled oscillator (VCO) 430 converts the minimum control signal to the variable frequency square wave, which drives the power switches M1, M2. VCO 430 provides a square wave with a lower frequency if the "control" signal increases, and provides the square wave with a higher frequency if the "control" signal decreases. Thus if the output of the protection feedback loop 410 is lower than the output of main control circuit 160, the switching frequency will increase, thereby preserving LLC converter operation with ZVS The aspects of this disclosure ensure zero voltage switching for the LLC converter, regardless of its operating conditions. This feature enables more aggressive optimization of the power stage without introducing a margin for ensuring zero voltage switching. As a result, system performance is enhanced, and system costs are reduced.

The techniques of this disclosure may also be described in the following examples.

Example 1. An LLC (inductor-inductor-capacitor) converter, comprising: a primary current sensing circuit operable to sense a primary current of the LLC converter; and a protection circuit coupled between the primary current sensing circuit and power switches of the LLC converter and operable to increase a switching frequency of the LLC converter when an amplitude of the primary current falls below a predefined low current reference value after a predefined blanking time after a phase transition of the LLC converter.

Example 2. The LLC converter of example 1, wherein the protection circuit comprises: a low current comparator circuit operable to generate a low current signal when the amplitude of the primary current falls below the predefined low current reference value; a blanking timer circuit operable to reset a blanking timer signal after the phase transition, and set the blanking timer signal at the predefined blanking time after the phase transition; and a switching frequency adjustment circuit, coupled to outputs of the low current comparator circuit and the blanking timer circuit, and operable to generate a below resonance protection signal to increase the switching frequency of the LLC converter based on a combination of the low current signal and the blanking timer signal.

Example 3. The LLC converter of any one or more of examples 1-2, wherein the predefined blanking time is set to be longer than a half period of a series resonance frequency of the LLC converter.

Example 4. The LLC converter of any one or more of examples 1-3, wherein the predefined low current reference value is lower than an amplitude of a magnetizing current of the LLC converter during normal operation.

Example 5. The LLC converter of any one or more of examples 1-4, wherein the switching frequency adjustment circuit is operable to increase the switching frequency by turning the power switches off.

Example 6. The LLC converter of any one or more of examples 1-5, wherein the switching frequency adjustment circuit is operable to increase the switching frequency by starting a new half-switching period.

Example 7. The LLC converter of any one or more of examples 1-6, wherein the switching frequency adjustment circuit is operable to increase the switching frequency by resetting a voltage-controlled oscillator for the power switches of the LLC converter.

Example 8. The LLC converter of any one or more of examples 1-7, wherein the switching frequency adjustment circuit comprises: an AND circuit element having a first input terminal connected to an output terminal of the low current comparator circuit, a second input terminal connected to an output terminal of the blanking timer circuit, and an output terminal operable to output the below resonance protection signal.

Example 9. The LLC converter of any one or more of examples 1-8, wherein the switching frequency adjustment circuit is operable to terminate a half switching period of the LLC converter and further comprises: an OR circuit element having a first input terminal connected to an output terminal of the AND circuit, and a second input terminal connected to an output terminal of a voltage-controlled oscillator, and an output terminal connected indirectly to the power switches of the LLC converter.

Example 10. The LLC converter of any one or more of examples 1-9, wherein the low current comparator circuit is operable to generate the low current signal when a switching frequency of the LLC converter is less than its resonant frequency.

Example 11. The LLC converter of any one or more of examples 1-10, wherein the low current comparator circuit is operable to generate the low current signal only when the LLC converter is operating in a freewheeling mode following a power delivery mode.

Example 12. The LLC converter of any one or more of examples 1-11, wherein the switching frequency adjustment circuit comprises: a protection feedback loop operable to compare a pulse width of the below resonance protection signal with a predefined width, wherein a control signal of the LLC converter is a minimum of an output of the protection feedback loop and an output of a main feedback control loop.

Example 13. A method of operating an LLC (inductor-inductor-capacitor) converter, comprising: sensing, by a primary current sensing circuit, a primary current of the LLC converter; and increasing, by a protection circuit, a switching frequency of the LLC converter when an amplitude of the primary current falls below a predefined low current reference value after a predefined blanking time following a phase transition of the LLC converter.

Example 14. The method of example 13, wherein the increasing the switching frequency comprises: generating, by a low current comparator circuit, a low current signal when the amplitude of the primary current falls below the predefined low current reference value; resetting, by a blanking timer circuit, a blanking timer signal after the phase transition; setting, by the blanking timer circuit, the blanking timer signal at the predefined blanking time after the phase transition; and generating, by a switching frequency adjustment circuit, a below resonance protection signal to increase the switching frequency of the LLC converter based on a combination of the low current signal and the blanking timer signal.

Example 15. The method of any one or more of examples 13-14, further comprising: setting the predefined blanking time to be longer than a half period of a series resonance frequency of the LLC converter.

Example 16. The method of any one or more of examples 13-15, further comprising: setting the predefined low current reference value to be lower than a magnetizing current of the LLC converter during normal operation.

Example 17. The method of any one or more of examples 13-16, wherein the adjusting the switching frequency of the LLC converter comprises: turning off power switches of the LLC converter, starting a new half switching period, reducing a duty cycle of the power switches of the LLC converter, or resetting a voltage-controlled oscillator for the power switches of the LLC converter.

Example 18. The method of any one or more of examples 13-17, wherein the low current signal is generated when a switching frequency of the LLC converter is less than its resonant frequency, or only when the LLC converter is operating in a freewheeling mode following a power delivery mode.

Example 19. The method of any one or more of examples 13-18, further comprising: comparing, by a protection feedback loop, a pulse width of the below resonance protection signal with a predefined width; and controlling the LLC converter with a control signal that is a minimum of an output of the protection feedback loop and an output of a main feedback control loop.

While the foregoing has been described in conjunction with exemplary aspects, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present disclosure. This disclosure is intended to cover any adaptations or variations of the specific aspects discussed herein.

What is claimed is:

1. An LLC (inductor-inductor-capacitor) converter, comprising:
   a primary current sensing circuit operable to sense a primary current of the LLC converter; and
   a protection circuit coupled between the primary current sensing circuit and power switches of the LLC converter, and operable to increase a switching frequency of the LLC converter when an amplitude of the primary current falls below a predefined low current reference value after a predefined blanking time after a phase transition of the LLC converter,
   wherein the protection circuit comprises:
      a low current comparator circuit operable to generate a low current signal when the amplitude of the primary current falls below the predefined low current reference value;
      a blanking timer circuit operable to reset a blanking timer signal after the phase transition, and set the blanking timer signal at the predefined blanking time after the phase transition; and
      a switching frequency adjustment circuit, coupled to outputs of the low current comparator circuit and the blanking timer circuit, and operable to generate a below resonance protection signal to increase the switching frequency of the LLC converter based on a combination of the low current signal and the blanking timer signal.

2. The LLC converter of claim 1, wherein the predefined blanking time is set to be longer than a half period of a series resonance frequency of the LLC converter.

3. The LLC converter of claim 1, wherein the predefined low current reference value is lower than an amplitude of a magnetizing current of the LLC converter during normal operation.

4. The LLC converter of claim 1, wherein the switching frequency adjustment circuit is operable to increase the switching frequency by turning the power switches off.

5. The LLC converter of claim 1, wherein the switching frequency adjustment circuit is operable to increase the switching frequency by starting a new half switching period.

6. The LLC converter of claim 1, wherein the switching frequency adjustment circuit is operable to increase the switching frequency by resetting a voltage-controlled oscillator for the power switches of the LLC converter.

7. The LLC converter of claim 1, wherein the switching frequency adjustment circuit comprises comprising:
   an AND circuit element having a first input terminal connected to an output terminal of the low current comparator circuit, a second input terminal connected to an output terminal of the blanking timer circuit, and an output terminal operable to output the below resonance protection signal.

8. The LLC converter of claim 7, wherein the switching frequency adjustment circuit is operable to terminate a half switching period of the LLC converter and further comprises:
   an OR circuit element having a first input terminal connected to an output terminal of the AND circuit, and a second input terminal connected to an output terminal of a voltage-controlled oscillator, and an output terminal connected indirectly to the power switches of the LLC converter.

9. The LLC converter of claim 1, wherein the low current comparator circuit is operable to generate the low current signal when a switching frequency of the LLC converter is less than its resonant frequency.

10. The LLC converter of claim 1, wherein the low current comparator circuit is operable to generate the low current signal only when the LLC converter is operating in a freewheeling mode following a power delivery mode.

11. The LLC converter of claim 1, wherein the switching frequency adjustment circuit comprises:
    a protection feedback loop operable to compare a pulse width of the below resonance protection signal with a predefined width,
    wherein a control signal of the LLC converter is a minimum of an output of the protection feedback loop and an output of a main feedback control loop.

12. A method of operating an LLC (inductor-inductor-capacitor) converter, comprising:
    sensing, by a primary current sensing circuit, a primary current of the LLC converter; and
    increasing, by a protection circuit, a switching frequency of the LLC converter when an amplitude of the primary current falls below a predefined low current reference value after a predefined blanking time following a phase transition of the LLC converter,
    wherein the increasing the switching frequency comprises:
        generating, by a low current comparator circuit, a low current signal when the amplitude of the primary current falls below the predefined low current reference value;
        resetting, by a blanking timer circuit, a blanking timer signal after the phase transition;
        setting, by the blanking timer circuit, the blanking timer signal at the predefined blanking time after the phase transition; and
        generating, by a switching frequency adjustment circuit, a below resonance protection signal to increase the switching frequency of the LLC converter based on a combination of the low current signal and the blanking timer signal.

13. The method of claim 12, further comprising:
    setting the predefined blanking time to be longer than a half period of a series resonance frequency of the LLC converter.

14. The method of claim 12, further comprising:
    setting the predefined low current reference value to be lower than a magnetizing current of the LLC converter during normal operation.

15. The method of claim 12, wherein the adjusting the switching frequency of the LLC converter comprises:
    turning off power switches of the LLC converter, starting a new half switching period, reducing a duty cycle of the power switches of the LLC converter, or resetting a voltage-controlled oscillator for the power switches of the LLC converter.

16. The method of claim 12, wherein the low current signal is generated when a switching frequency of the LLC converter is less than its resonant frequency, or only when the LLC converter is operating in a freewheeling mode following a power delivery mode.

17. The method of claim 12, further comprising:
    comparing, by a protection feedback loop, a pulse width of the below resonance protection signal with a predefined width; and
    controlling the LLC converter with a control signal that is a minimum of an output of the protection feedback loop and an output of a main feedback control loop.

* * * * *